US008389878B2

(12) United States Patent
Abercrombie et al.

(10) Patent No.: US 8,389,878 B2
(45) Date of Patent: Mar. 5, 2013

(54) WEIGH-IN-MOTION SCALE WITH FOOT ALIGNMENT FEATURES

(75) Inventors: Robert Knox Abercrombie, Knoxville, TN (US); Gregory David Richardson, Knoxville, TN (US); Matthew Bligh Scudiere, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 356 days.

(21) Appl. No.: 12/732,594

(22) Filed: Mar. 26, 2010

(65) Prior Publication Data

US 2011/0232973 A1    Sep. 29, 2011

(51) Int. Cl.
*G01G 21/00* (2006.01)
(52) U.S. Cl. ......... 177/126; 177/132; 177/133; 177/238
(58) Field of Classification Search .................. 177/126, 177/127, 132–134, 238
See application file for complete search history.

(56) References Cited

U.S. PATENT DOCUMENTS

| | | | | |
|---|---|---|---|---|
| 3,123,166 A | * | 3/1964 | Schellentrager | 177/211 |
| 3,999,621 A | * | 12/1976 | Wagner | 177/1 |
| 4,134,467 A | * | 1/1979 | Czyryk | 177/133 |
| 4,658,923 A | * | 4/1987 | Labarile | 177/255 |
| 5,959,259 A | | 9/1999 | Beshears et al. | |
| 5,998,741 A | | 12/1999 | Beshears et al. | |
| 6,459,050 B1 | | 10/2002 | Muhs et al. | |
| 7,305,324 B2 | | 12/2007 | Beshears et al. | |
| 7,375,293 B2 | * | 5/2008 | Beshears et al. | 177/25.13 |
| 7,423,225 B1 | * | 9/2008 | Kroll et al. | 177/132 |
| 2008/0095404 A1 | | 4/2008 | Abercrombie et al. | |
| 2009/0125273 A1 | | 5/2009 | Hively et al. | |

OTHER PUBLICATIONS http://www.ioc.ornl.gov/projects/wim.shtml, WEIGH-IN-MOTION (WIM), Apr. 29, 2009, Cyberspace Sciences and Information Intelligence Research, (4 pages).

* cited by examiner

*Primary Examiner* — Randy W Gibson
(74) *Attorney, Agent, or Firm* — Luedeka Neely Group, P.C.

(57) ABSTRACT

A pad is disclosed for use in a weighing system for weighing a load. The pad includes a weighing platform, load cells, and foot members. Improvements to the pad reduce or substantially eliminate rotation of one or more of the corner foot members. A flexible foot strap disposed between the corner foot members reduces rotation of the respective foot members about vertical axes through the corner foot members and couples the corner foot members such that rotation of one corner foot member results in substantially the same amount of rotation of the other corner foot member. In a strapless variant one or more fasteners prevents substantially all rotation of a foot member. In a diagonal variant, a foot strap extends between a corner foot member and the weighing platform to reduce rotation of the foot member about a vertical axis through the corner foot member.

14 Claims, 2 Drawing Sheets

WEIGH-IN-MOTION SCALE WITH FOOT ALIGNMENT FEATURES

GOVERNMENT RIGHTS

This invention was made with government support under Contract No. DE-AC05-00OR22725 awarded by the U.S. Department of Energy. The government has certain rights in the invention.

CROSS REFERENCES TO RELATED APPLICATIONS

This patent application is related to U.S. Pat. No. 5,959,259, titled "System and Method for Accurately Weighing and Characterizing Moving Vehicles", issued Sep. 28, 1999; U.S. Pat. No. 5,998,741, titled "System and Methods for Accurately Weighing and Characterizing Moving Vehicles", issued Dec. 7, 1999; U.S. Pat. No. 6,459,050, titled "Method and Apparatus for Converting Static In-ground Vehicle Scales Into Weigh-In-Motion Systems", issued Oct. 1, 2002; U.S. Pat. No. 7,305,324, titled "System and Method for Identifying, Validating Weighing and Characterizing Moving or Stationary Vehicles and Cargo", issued Dec. 4, 2007; U.S. Pat. No. 7,375,293, titled "System and Method for Weighing and Characterizing Moving or Stationary Vehicles and Cargo", issued May 20, 2008; and U.S. Pat. No. 7,423,225, titled "Weigh In Motion Technology", issued Sep. 9, 2008; all herein incorporated by reference in their entirety.

FIELD

This disclosure relates to the field of weigh-in-motion systems. More particularly, this disclosure relates to improvements to a weigh-in-motion system for aligning the load cell foot members for attachment with the pad base.

BACKGROUND

Recent improvements to weigh-in-motion (WIM) systems, such as those described in U.S. Pat. No. 7,423,225 to Kroll et al., have provided man-portable means of accurately determining axle weights and spacings, total vehicle weight and longitudinal center of gravity for vehicles and pallets as they pass over WIM transducers. Because of the automated nature of WIM, it eliminates human errors due to time stresses, adverse weather conditions, and manual calculations and data entry.

Recent WIM technologies also provide a system and method for accurately measuring the weight of individual tire(s), the speed profile of the vehicle, the individual axle weights, the distance between axles, and the lateral and the longitudinal center of balance of the vehicle. The information is required for military deployments to load and balance an aircraft prior to take-off. The characteristics are also useful to commercial vehicle law enforcement officers to quickly and accurately determine the individual axle weights for highway safety. Industry uses this technology to determine the tare weight on incoming vehicles and then determine the load weight as the vehicle exits the facility. The technology is used to quickly and accurately determine the weight of product delivered to a facility. This WIM technology improves the weighing process by reducing personnel hours and the time required for deployment and by eliminating opportunities for human errors from the manual transfer of data or from the miscalculation of vehicle attributes.

Earlier solutions to accommodate ease of setup and teardown incorporated fixing the leading and trailing load cells. This "locking in place" results in the overall weight data being affected by the load cells themselves binding as vehicles crossed the weigh pads. When the load cells leading plate is removed, accuracy is better. However, when this technique is incorporated, setup and teardown becomes problematic. The current state of the art lacks a system that is easily installed and removed from its desired location. Typically problems encountered during installations include rotation of the foot members of a weighing system with respect to one another or with respect to the weighing platform. For these and other reasons, a weighing system having a pad with foot members having minimal or reduced rotation with respect to one another and/or with respect to the platform of the pad was needed.

SUMMARY

The present disclosure provides a pad for use in a weighing system for weighing a load. The system includes a weighing platform having a bottom surface and a top surface for receiving the load to be weighed. A number of load cells are arranged in the pad. One configuration consists of three load cells arranged along the leading and trailing edges with additional multiple load cells (in some instances two load cells) spaced appropriately in the middle portion of the weigh pad. The two exterior load cells on each leading and trailing edge (i.e. a first load cell and a second load cell are arranged in a pair) and are aligned laterally with respect to the travel path. Each load cell has a top surface and a bottom surface. The load cell is attached to the weighing platform such that the top surface of each load cell is disposed adjacent the bottom surface of the weighing platform. The system also includes a first foot member and a second foot member each having a top surface and a bottom surface. The first foot member is attached to the first load cell such that the top surface of the first foot member is disposed adjacent the bottom surface of the first load cell, and the second foot member is attached to the second load cell such that the top surface of the second foot member is disposed adjacent the bottom surface of the second load cell. The bottom surfaces of each of the corner foot members are for contacting a substrate. For weighing systems having corner foot members it is desirable to have minimal or reduced rotation of the corner foot members with respect to one another and/or with respect to the platform of the pad, while maintaining the accuracy of the "free load cells" on the leading and trailing edge of the weigh pad. To accommodate that consideration an improvement to the pad is a flexible foot strap extending between two corner foot members for reducing rotation of the corner foot members, and for coupling the corner foot members such that rotation of either of the corner foot members about its vertical axis results in substantially the same amount of rotation of the other corner foot member about its vertical axis. In some embodiments, the vertical axes are substantially through the centers of the corner foot members.

Another embodiment comprises a first fastener for attaching the corner foot members to the weighing platform for preventing substantially all rotation of corner foot members about a substantially vertical axis through the corner foot member. In some embodiments, the corner foot member is attached to the weighing platform by a second fastener for preventing substantially all rotation of the corner foot member about a substantially vertical axis. In some embodiments, the vertical axes are substantially through the centers of the corner foot members. In some, one or more additional fasteners assist the first fastener in preventing rotation of the corner foot member and one or more additional fasteners assist the second fastener in preventing rotation of the corner foot member.

Another embodiment includes a first foot strap disposed extending between corner foot members and the weighing platform for reducing rotation of the corner foot member about a substantially vertical axis through the corner foot member. In some embodiments, the axes are substantially through the center of the corner foot members. In some embodiments, the foot strap(s) are flexible and in some embodiments, particularly where a foot strap extends between the corner foot members and the weighing platform, the foot strap(s) is (are) rigid. The rigid foot strap(s) is/are for preventing substantially all rotation of the corner foot member(s).

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred embodiments, reference is made to the accompanying drawings, which form a part hereof, and within which are shown by way of illustration the practice of specific embodiments of the improvement to weigh-in-motion technology. It is to be understood that other embodiments may be utilized, and that structural changes may be made and processes may vary in other embodiments.

A weighing system consists of very low profile weight sensors or pads on the ground laid out along the direction of travel for the vehicle to be weighed. Each of these sensors consists of multiple load cells or sensors arranged along the edges and in some applications along the centers of the pads. From these arrangements the total weight of the vehicle's load as well as the center of mass of the load and other values may be calculated.

Figure 1:
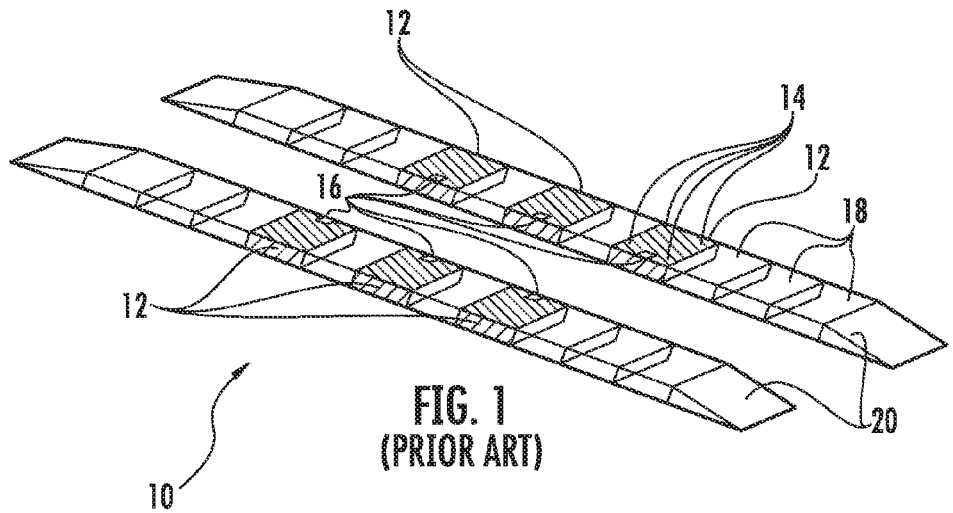
FIG. 1 is a perspective view of a weighing system including several pads.

The weighing system 10 is shown in FIG. 1. The system 10 includes one or more sets of pads 12 (1 or more pairs, with 3 pairs shown) each with individual transducers (also referred to as sensors or load cells) 14 located within the pads 12. The pads 12 measure the weight moment of an entity set (e.g. tire(s)) as it/they roll(s) over the pads 12 at a velocity that is sufficiently slow to enable a transducer response. The term "entity set" as used herein refers to an element that presents a cargo container for measurement of a weight by the transducer. In addition to one or more tires, an "entity set" may be a pallet skid, the bottom of a carton, a conveyor belt, one or more rollers, or similar articles. The system 10 is also capable of providing a static weight for the entity set (in this case tire(s)) when the entity set (tire(s)) is stationary on the pad 12. Furthermore, the system typically includes a pad microcomputer 16 having a bus structure onboard each individual pad 12. The pad microcomputers 16 are configured for distributed intelligence and interchangeability of pads 12. The system 10 then may be used to determine tire weight, time of tire on pad center, and speed of tire over pad center in a dynamic mode. In some embodiments, the system 10 includes a daisy chain connection between each of the pads 12 to provide power and transmit accumulated data. In some applications in the dynamic mode, a host microcomputer collects data from the individual transducers, identifies the individual transducers, determines their relative positions, and determines the attributes of interest such as individual tire(s) weights, individual axle weights, axle spacing, speed profiles and longitudinal and transverse center of balance. In the static mode, similar data are collected but such data are characterized as static data.

The system 10, in some embodiments, also includes leveling pads or spacers 18 to allow a vehicle to become horizontal as it passes over the transducers 14 for in-motion weighing. Attached to the outer-most spacers 18 are entrance and exit ramps 20 which provide a smooth transition from ground level to the transducer height for in-motion weighing. Truck suspensions have a typical suspension constant of about 10,000 lbs/inch. That corresponds to 1000 lbs for a rise of just a tenth of an inch. Typical truck suspensions have a resonant frequency of around 3 Hz. It is important not to exceed acceptable thresholds of bouncing as the vehicle rolls over the system 10. Doing so could produce significant errors irrespective of the accuracy of the weighing system 10. Accordingly, having long smooth ramps 20 at both the entrance and exit is helpful for accurate weighing.

Figure 2:
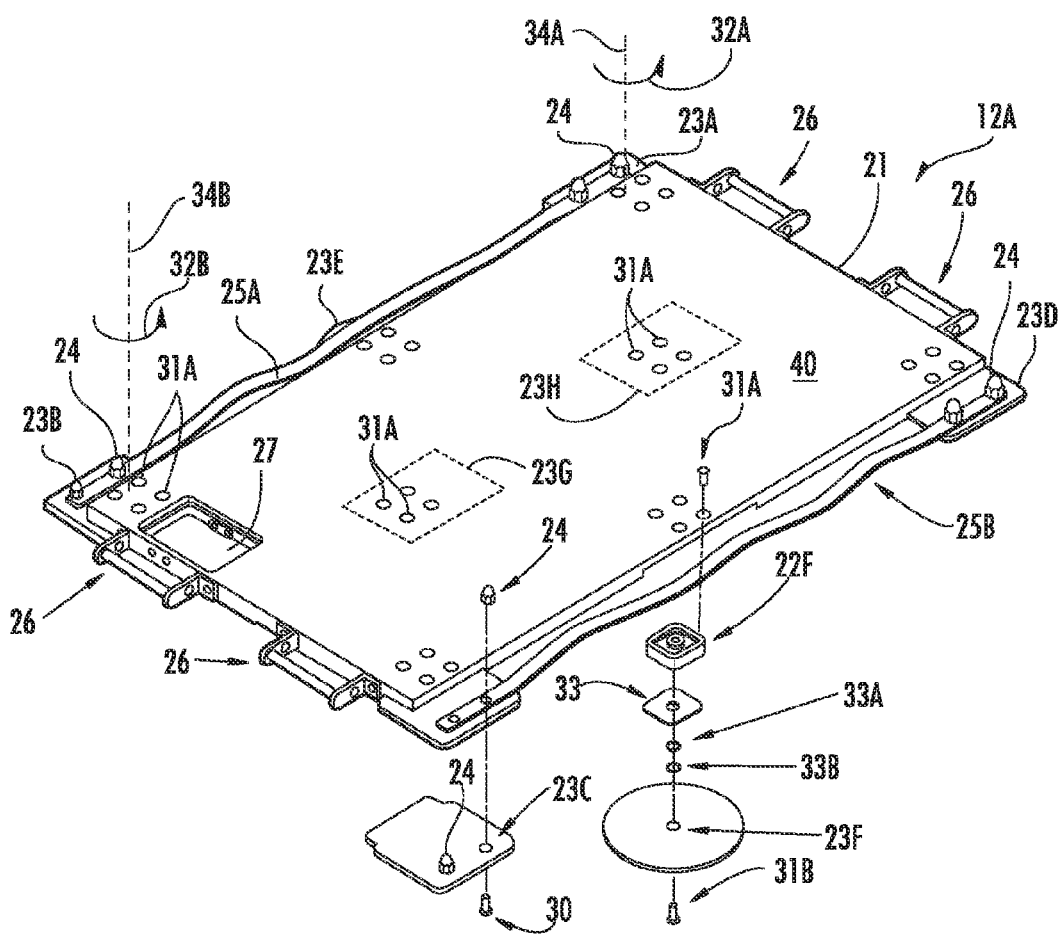
FIG. 2 is a perspective, partial, exploded view of an embodiment of a pad of the weighing system.

Referring to FIG. 2, an embodiment of a pad 12A is shown with four corner foot members 23A, 23B, 23C, and 23D, plus two side foot members 23E, 23F, plus two center foot members 23G, and 23H. Expanded views are provided depicting portions of the assembly of two corner foot members 23C and 23F that are disposed adjacent a rectangular platform 21. Also depicted is an exemplary load cell 22F. A top surface of a foot member is disposed adjacent a bottom surface of a load cell, and a bottom surface of a foot member contacts a substrate such as wood, concrete or gravel. The pad 12A is useable in the weighing system 10 described above. The pad 12A is also useable as a stand-alone, low profile electronic weighing scale. The pad 12A generally includes a platform 21, at least one load cell 22 (only 22F is shown), and a plurality of foot members 23A-23H each having a corresponding load cell. The notation "nn" (e.g., "22") is used herein to describe a particular type of element (such as a "load cell"), and that "nn" notation is modified to "nnX" (e.g., "22F") to identify a specific instance of that element. Foot pins 24, flexible foot straps 25A and 25B, handles 26, and an on-board control circuit 27 are also included in the embodiment of the pad 12A shown. Handles 26 facilitate transportation of the pads 12A. Control circuit 27 may include a summing board, an analog to digital converter, a microprocessor, or a similar components or a combination of such components, and is communicatively connected to an interface and CPU in some applications. Alternatively, load cell 22 output may be read individually, digitally converted and processed. The load cells 22 may be summed analog or digitally, either on board the pad 12A or externally, for example via the CPU.

The foot pins 24 are preferably arranged in longitudinally aligned pairs at the corners of the pad 12A and are connected to the corner foot members 23A-23D via screws 30, which also secure ends of flexible, elongated, and longitudinally oriented foot straps 25A and 25B. The foot pins 24 extend upwardly a predetermined distance from the top surface of the foot members 23A-23H, preferably so that their top ends are level with the top surface 40 of platform 21.

In order to improve the accuracy of weight measurements it is desirable that the corner foot members 23A, 23B, 23C, and 23D be aligned as indicated in FIG. 2 while the pad 12A is being deployed in service. The flexible straps 25A and 25B generally retain proper alignment of corner foot members (e.g., 23A with 23B and 23C with 23D for attachment with the platform 21 and reduce the amount of rotation (as depicted by arrows 32A and 32B) of a corner foot member (e.g., corner foot members 23A and 23B) about exemplary axes 34A and 34B extending vertically from the corner foot members 23A and 23B. In some embodiments the exemplary axes 34A and 34B extend through the center of the corner foot members 23A and 23B, respectively. The flexible foot straps 25A and 25B also help to keep the foot members 23A and 23B, and 23C and 23D the proper distance from one another for proper alignment with the platform 21 while the pad 12A is being deployed for service. The foot straps (e.g. 25A and 25B) may extend between foot members located at any two corners (e.g. parallel with the travel path, perpendicular to the travel path, or diagonally across the travel path).

This alignment benefit during deployment is attributable to a coupling between two corner foot members (e.g., corner foot members 23A and 23B) that is established by a flexible foot strap (e.g., flexible foot strap 25A). There is a frictional force between each corner foot member (24A, 24B, 24C, and 24D) and the platform 21 that resists rotation of a corner foot member (e.g., corner foot members 23A or 23B) around its rotational axis (e.g., exemplary axes 34A and 34B). By coupling two corner foot members together the amount of force that is required to rotate either corner foot member is essentially doubled. This double resistance helps maintain the alignment of the corner foot members (e.g., 23A, 23B, 23C, and 23D) while the pad 12A is being unpacked and moved to an installation site.

Once the pad 12A has been placed in service, it is desirable that a slight rotation of one of the corner foot members (e.g. corner foot member 23A) does not cause a rotation of another corner foot member (e.g., corner foot member 23B) because such coupled rotation has been shown to adversely affect the accuracy of weight measurements. Once the pad 12A has been placed in service, additional frictional forces between the corner foot members (e.g. 23A, 23B, 23C, and 23D) and the pavement where the pad 12A is mounted increase the amount of force that is needed to rotate a corner foot member around its rotational axis (e.g., exemplary axes 34A and 34B). The flexible foot straps 25A and 25B are configured to bend or buckle before such additional resistive rotational force is overcome. Thus, a "flexible" foot strap is characterized as follows. A "flexible" foot strap (e.g., 25A) is sufficiently stiff that the corner foot pads to which it is attached (e.g., 23A and 23B) remain substantially aligned while the pad 12A is being placed in service, and a flexible foot strap (e.g., 25A) is sufficiently bendable such that after the pad 12A is placed in service a rotation of one of the corner foot members to which the flexible foot strap (e.g., 25A) is attached (e.g., 23A or 23B) does not cause a rotation of the other corner foot member to which it is attached (e.g., 23B or 23A).

In some embodiments a "flexible" foot strap may be "flaccid," meaning that it flexes under any compressive force greater than its weight. In some embodiments a "flexible" foot strap may be "pliant," meaning that it may be folded or bent by manual manipulation without the use of tools.

One embodiment of a pad 12A is a rectilinear, preferably rectangular, member constructed of a rigid material, preferably a metal such as stainless steel or aluminum. Pads 12A are preferably relatively thin so that they have a low profile for ease of traversal and for light weight. They have a flat top surface 40 of predetermined dimensions and area, relatively thin sides, and a bottom surface. The bottom surface is substantially flat with a plurality of load cell recesses or cavities of a predetermined rectangular dimension, disposed at corner and predetermined central locations. Load cell screw apertures, preferably four (4) each, are located at each recess to permit load cell top screws or fasteners 31B to connect from the top of the pad 21 to a load cell (e.g., load cell 22F) disposed in each cavity. A foot cavity or recess of a predetermined rectangular (at corner locations) or circular (at center locations) shape is aligned with each load cell cavity. The dimensions of the foot cavities are larger than or overlap those of the respective load cell cavities.

Each load cell (e.g., load cell 22F) is placed on top of a foot member (e.g., foot member 23F. Lower screw 31B passes through the foot member 23F, through lower and upper washers 33B and 33A, through gasket 33 (which aids in sealing the load cell 22 in its cavity) to the bottom of the load cell 22F. Upper screws 31A connect the load cell 22 to the platform 21. Corner foot members 23A-23D are disposed at corner locations of the pad 12A, while side foot members 23E-23F are disposed in the middle of sides of the pad 12A. The location of the corner foot members 23A-23D is such that they extend substantially horizontally outwardly beyond the platform 21. Side foot members 23E and 23F extend slightly outwardly beyond the platform 21. The dimensions of the load cell (e.g., load cell 22F), the bottom screw 31B, and washers 33 elevate the bottom of the load cell (e.g., load cell 22F) from the top of the adjacent foot member (e.g. side foot member 23F).

Figure 3:
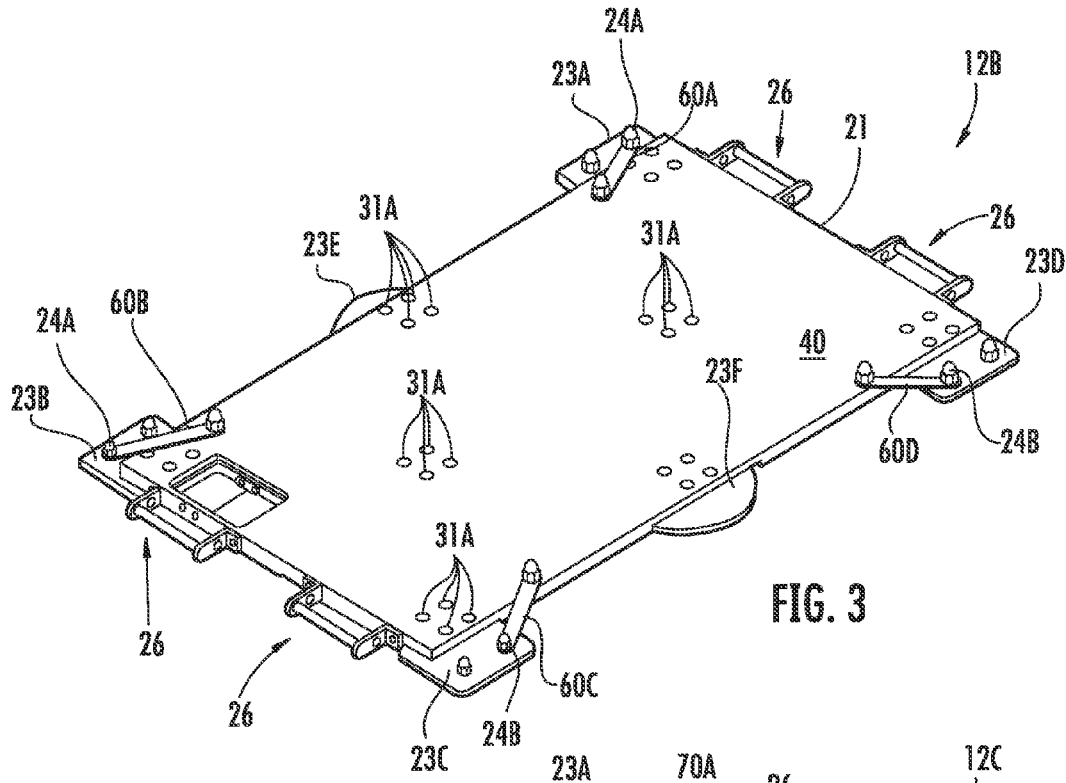
FIG. 3 is a perspective view of another embodiment of the pad of the weighing system.

One embodiment of the present invention, referred to as a "diagonal variant," as shown in FIG. 3, provides an improvement to the pad 12B having foot straps 60A, 60B, 60C, and 60D. Foot straps 60A-60D attach corner foot members 23A-23D respectively to the platform 21. The straps 60A-60D prevent excessive movement of the foot members 23A-23D with respect to the platform 21. Specifically, the straps 60A-60D prevent excessive rotation of the foot members 23A-23D about a vertical axis (for example 34A and 34B) through the corner foot members 23A-23D. Typically, the foot members (e.g., side foot member 23F) are attached to the load cells (e.g., load cell 22F) via fasteners (e.g., fastener 31A and 31B) near or at the center of the foot members (e.g., side foot member 23F) as best shown in the partial exploded view of side foot member 23F in FIG. 2.

Referring back to FIG. 3, the straps 60A-60D in such configurations prevent rotation of the corner foot members 23A-23D about a vertical axis, such as axes 34A and 34B. In some embodiments the vertical axes are through what is substantially the center of the corner foot members 23A-23D. The straps 60 may be attached either to the outer-most foot pin 24A as shown with regard to straps 60B and 60A, or the straps 60 may be attached to the inner foot pin 24B as shown with regard to straps 60C and 60D.

The foot straps 60A-60D of the embodiment of FIG. 3 may be either flexible or rigid. In one application, the flexible foot straps 60A-60D provide an opportunity to rotate the corner foot members 23A, 23B, 23C, and 23D a small amount when attaching the foot member/load cell combination to the platform 21 with fasteners (e.g., fasteners 31A and 31B). However, rigid foot straps 60A-60D prevent substantially all rotation of the corner foot members 23A, 23B, 23C, and 23D and may provide easier assembly of the pad 12B given that component size tolerances are sufficiently accurate to allow assembly without minor rotation of the corner foot members 23A-23D or modification of their placement with respect to the platform 21. Additionally, as discussed previously regarding foot straps 25A and 25B of pad 12A in FIG. 2, when pad 12B is used as pad 12 in weighing system 10 of FIG. 1, the foot straps 60A-60D of pad 12B also assist during assembly of a weighing system 10 by preventing some or all rotation of foot members 23A, 23B, 23C, or 23D as one or more pads 12B are aligned and attached to other components of the weighing system 10, such as spacers 18.

Figure 4:
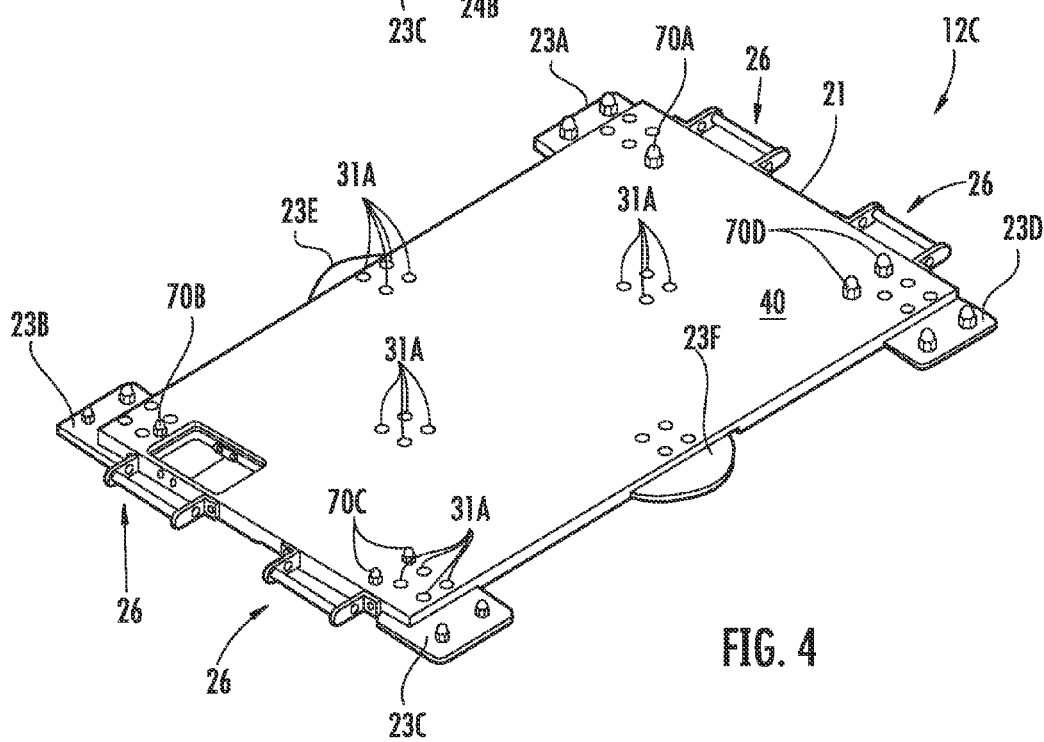
FIG. 4 is a perspective view of yet another embodiment of the pad of the weighing system.

In another embodiment of the invention shown in FIG. 4, a pad 12C is shown having no foot straps (a "strapless variant.") This embodiment instead incorporates additional pinholes 70A, 70B, 70C, and 70D. Various combinations of pinholes 70A-70D and fasteners 31A, may be used. For example, pinhole 70A and pinhole 70B are single additional pinholes used to prevent rotation of the foot members 23A and 23B with respect to the platform 21. Pinholes 70C and 70D are used to prevent rotation of the corner foot members 23C and 23D with respect to the platform 21. Similarly, additional pinholes and fasteners may be used to prevent rotation of the foot members with respect to the platform, thereby, for example, assisting in assembly of the weighing system 10 of FIG. 1 by facilitating proper alignment of the corner foot members 23A, 23B, 23C, and 23D with spacers 18 or other weighing system 10 components. This configuration allows advantages in the manufacturing process as all corner load cell assemblies are now interchangeable and also can be replaced easily in the field.

In summary, embodiments disclosed herein reduce or substantially eliminate rotation of corner foot members 23A, 23B, 23C and 23D about vertical axes (e.g. 34A, 34B) thereby assisting in alignment and assembly of pads 12 and, subsequently, weighing systems 10. With strapless variants the manufacturing cycle time is reduced and maintenance cycle time in the field is simpler, faster and thus more cost effective.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. In a pad for use in a weighing system for weighing a load, the pad including a weighing platform having a bottom surface and a top surface for receiving the load to be weighed, two load cells arranged at corners of the pad, each load cell having a top surface and a bottom surface, and each load cell being attached to the weighing platform such that the top surface of each load cell is disposed adjacent the bottom surface of the weighing platform, two corner foot members each having a substantially vertical axis and a top surface disposed adjacent the bottom surface of a load cell and a bottom surface for contacting a substrate, the improvement comprising:
a pliant foot strap, said strap extending between said two corner foot members.

2. The pad of claim 1 wherein the pad comprises four load cells arranged at corners of the pad, each load cell having a top surface and a bottom surface, each load cell being attached to the weighing platform such that the top surface of each load cell is disposed adjacent the bottom surface of the weighing platform, and wherein the pad comprises four corner foot members each having a substantially vertical axis and a top surface disposed adjacent the bottom surface of a load cell, and wherein the improvement comprises two foot straps, each said strap extending between two of said four corner foot members.

3. The pad of claim 1 wherein each substantially vertical axes is substantially through the center of the corner foot member.

4. The pad of claim 2 wherein each substantially vertical axes is substantially through the center of the corner foot member.

5. In a pad for use in a weighing system for weighing a load, the pad including a weighing platform having a bottom surface and a top surface for receiving the load to be weighed, a load cell arranged at a corner of the pad, said load cell having a top surface and a bottom surface, said load cell being attached to the weighing platform such that the top surface of said load cell is disposed adjacent the bottom surface of the weighing platform, a corner foot member having a substantially vertical axis and a top surface disposed adjacent the bottom surface of said load cell and a bottom surface for contacting a substrate, and the improvement comprising:
a flexible foot strap, said foot strap extending between said corner foot member and the weighing platform, the foot strap for reducing rotation of the corner foot member about the substantially vertical axis through the corner foot member.

6. The pad of claim 5 wherein the improvement comprises four foot straps and four corner foot members with each foot member having a substantially vertical axis and a top surface disposed adjacent the bottom surface of the load cell and a bottom surface for contacting the substrate, each foot strap extending between a corner foot member and the weighing platform, each foot strap for reducing rotation of the corner foot member about the substantially vertical axis through the corner foot member.

7. The pad of claim 5 wherein each substantially vertical axis is substantially through the center of the corner foot member.

8. The pad of claim 6 wherein each foot strap is flexible.

9. The pad of claim 6 wherein each substantially vertical axis is substantially through the center of the corner foot member.

10. In a pad for use in a weighing system for weighing a load, the pad including a weighing platform having a bottom surface and a top surface for receiving the load to be weighed, four load cells arranged at corners of the pad, each load cell having a top surface and a bottom surface, the load cell being attached to the weighing platform such that the top surface of each load cell is disposed adjacent the bottom surface of the weighing platform, four corner foot members each having a substantially vertical axis and a top surface disposed adjacent the bottom surface of a load cell and a bottom surface for contacting a substrate, wherein the improvement comprises:
at least one fastener attaching each corner foot member to the weighing platform for preventing substantially all rotation of the corner foot member about the substantially vertical axis through the corner foot member.

11. The pad of claim 10 wherein each substantially vertical axis is substantially through the center of the corner foot member.

12. The pad of claim 10 wherein the improvement comprises a plurality of fasteners attaching at least two corner foot members to the weighing platform for preventing substantially all rotation of the at least two corner foot members about the substantially vertical axis through the at least two corner foot members.

13. The pad of claim 12 wherein each substantially vertical axis is substantially through the center of the corner foot member.

14. The pad of claim 10 wherein the improvement comprises a plurality of fasteners attaching each of the corner foot members to the weighing platform for preventing substantially all rotation of the corner foot members about the substantially vertical axis through the corner foot members.

* * * * *